May 21, 1963 K. R. BROOKS 3,090,068
WINDSHIELD WIPER

Filed July 3, 1961 3 Sheets-Sheet 1

KENNETH R. BROOKS
INVENTOR.

BY John R. Faulkner
Keith L. Jerschling

ATTORNEYS

May 21, 1963  K. R. BROOKS  3,090,068
WINDSHIELD WIPER
Filed July 3, 1961  3 Sheets-Sheet 2
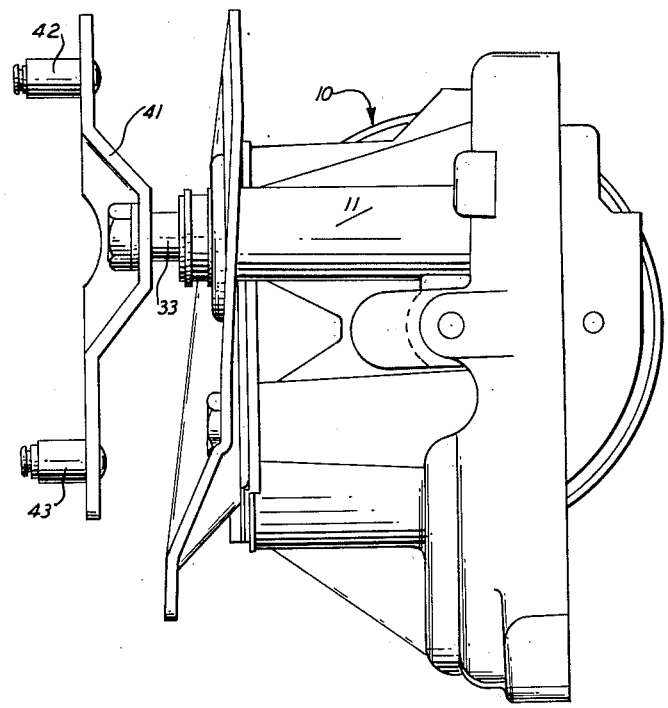
FIG.2
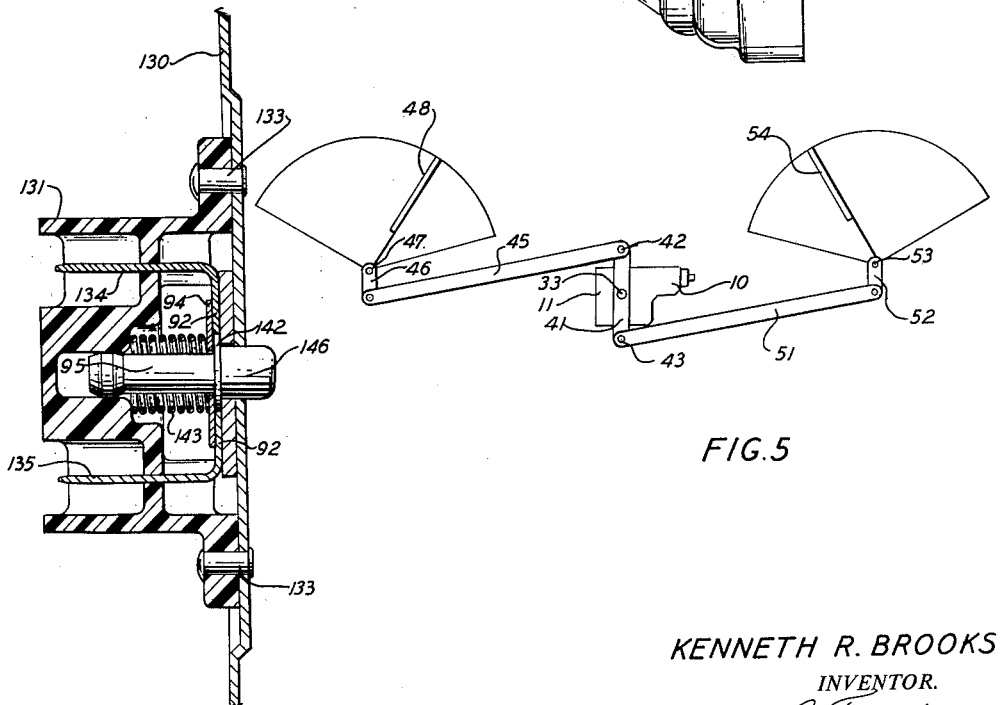
FIG.9
FIG.5
KENNETH R. BROOKS
INVENTOR.
BY John L. Faulkner
Keith L. Jerschling
ATTORNEYS

KENNETH R. BROOKS
INVENTOR.

BY John C. Faulkner
Keith L. Zerschling
ATTORNEYS

United States Patent Office 3,090,068
Patented May 21, 1963

3,090,068
WINDSHIELD WIPER
Kenneth R. Brooks, Dexter, Mich., assignor to Ford Motor Company, Dearborn, Mich., a corporation of Delaware
Filed July 3, 1961, Ser. No. 121,429
3 Claims. (Cl. 15—250.17)

This invention relates to an electric windshield wiper for an automotive vehicle and more particularly to such a windshield wiper system employing novel means for producing two speed operation.

In the preferred embodiment of the invention an electrical motor is employed to drive the windshield wiper mechanism. This electric motor has a pair of field windings, preferably shunt field windings, that are energized from a source of electrical energy through a switch. When the switch is in one position these windings are connected in series to operate the windshield wiper linkage and the blades at a certain speed. When the switch is thrown to the other position the field windings are connected in parallel with one another. This increases the field flux of the motor and causes a speed reduction in the electrical motor and the wiper linkage and blades that it drives.

The invention may be employed as a two speed windshield wiper system, but it may also be employed in a constant speed system in which the switch is positioned to connect the field windings in series during normal operation. The other position of the switch is employed as the parking position and in this instance the field coils are energized in parallel with one another through a parking switch that is opened periodically. The speed of the electric motor and hence the speed of the linkage is reduced, and the linkage and blades will come to an easily controlled stop when the parking switch is opened.

The present invention possesses the advantage over known two speed windshield wiper systems in that no extra windings or resistors are necessary to provide the two speed operation. All of the electrical components are utilized during both speeds of operation.

An object of the present invention is the provision of a two speed windshield wiper mechanism.

Another object of the invention is to provide a two speed windshield wiper mechanism in which a pair of field windings for an electric motor are connected in series with one another for high speed operation and are connected in parallel with one another for low speed operation.

A further object of the invention is the provision of a windshield wiper mechanism that operates at a certain speed during normal operating conditions, but operates at a reduced speed just prior to parking.

Other objects and attendant advantages of the present invention will become more readily apparent as the specification is considered in connection with the accompanying drawings in which:

FIG. 2 is an end elevational view of the electric windshield wiper motor assembly of FIG. 1;

FIG. 3 is a sectional view taken along the lines 3—3 of FIG. 1;

FIG. 4 is a sectional view taken along the lines 4—4 of FIG. 1;

FIG. 5 is a schematic view of the entire windshield wiper assembly showing how the electric motor assembly is connected to drive the windshield wiper blades;

FIG. 9 is a sectional view of a parking switch that may be employed with the present invention.

Figure 1:
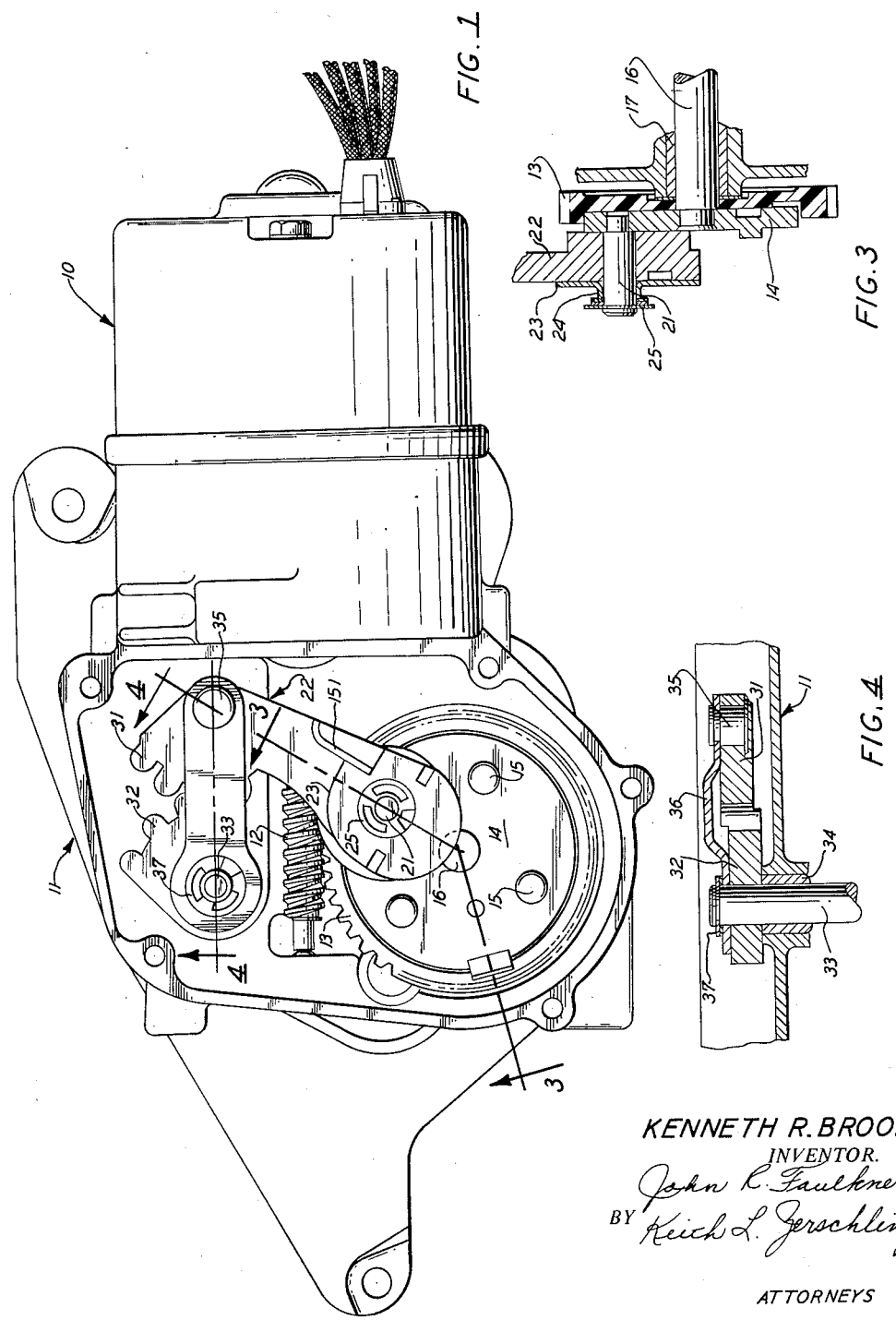
FIG. 1 is a side elevational view of the electric windshield wiper motor assembly of the present invention with the cover plate removed.

Referring now to the drawings in which like reference numerals designate like parts throughout the several views thereof, there is shown in FIG. 1 the electric motor assembly of the present invention including an electric motor, generally designated by the numeral 10, mounted within a housing, generally designated by the numeral 11. The electric motor 10 drives a worm 12 that meshes with a plastic gear, preferably nylon, designated by the numeral 13. This gear is reinforced by means of a metallic plate 14 suitably affixed thereto, preferably by a plurality of rivets 15. The gear and plate are supported within the housing 11 by means of a shaft 16 and sleeve bearing 17 (see FIG. 3).

The reinforcing plate 14 carries a shaft 21 radially spaced from the shaft 16. A crank 22 is rotatably journaled on the shaft 21 and is secured axially by means of a washer 23 having an upstanding portion 24 and a clip 25. The crank 22 has a sector gear 31 positioned at one extremity that engages another sector gear 32. The sector gear 32 is rotatably supported within housing 11 by means of a shaft 33 and a sleeve bearing 34 (see FIG. 4). The sector gear 31 carries a stud 35 which engages a link 36 that connects the stud with the shaft 33. A clip 37 is positioned over the end of the shaft 33 to hold the link in engagement with the shaft. The purpose of the link is to hold sector gears 31 and 32 in engagement.

As can best be seen by reference to FIG. 2, the shaft 33 protrudes from the housing 11 and has a lever 41 affixed thereto. This lever 41 has a pin 42 positioned at one end thereof and a pin 43 positioned at the other end thereof. The shaft 33 is the output shaft of the motor assembly and is adapted to oscillate the lever 41 as will be explained more fully subsequently.

Referring now to FIG. 5 that shows a schematic of the windshield wiper mechanism of this invention, the electric motor assembly, including motor 10 and housing 11, is shown with the output shaft 33 connected to the lever 41. The pin 42 carried by the lever 41 is connected to a link 45 that in turn is connected to a crank 46. This crank is connected to a shaft, designated schematically at 47, and the shaft 47 is in turn connected to windshield wiper blade 48 in the well known manner. Similarly, the pin 43 carried by the lever 41 is connected to a link 51 that drives a crank 52. The crank in turn is connected to shaft 53 that drives windshield wiper 54.

The structure shown in FIGS. 1 through 5, and described above, is a conventional windshield wiper structure, and when the motor 10 turns the worm 12 it rotates the nylon gear 13 thereby rotating the pin 21 and the crank 22 journaled thereon. This action moves the sector gear 31 in an oscillating fashion and this oscillating movement is transferred to the sector gear 32. Sector gear 32 in turn transmits this oscillating motion to the output shaft 33 that oscillates lever 41. The lever 41 through the mechanism described in relation to FIG. 5 drives the windshield wiper blades 48 and 54 in an oscillating fashion through the angles indicated. As shown here, the windshield wiper blades park in an inboard position and the wipers move from this inboard position to an outboard position in synchronism with one another. It is to be understood that the drive mechanism shown on the drawings and described above is only illustrative of the mechanism that can be employed with the present invention. A rotary windshield wiper mechanism may similarly be employed with linkage that provides parallel movement of the windshield wiper blades.

Figure 6:
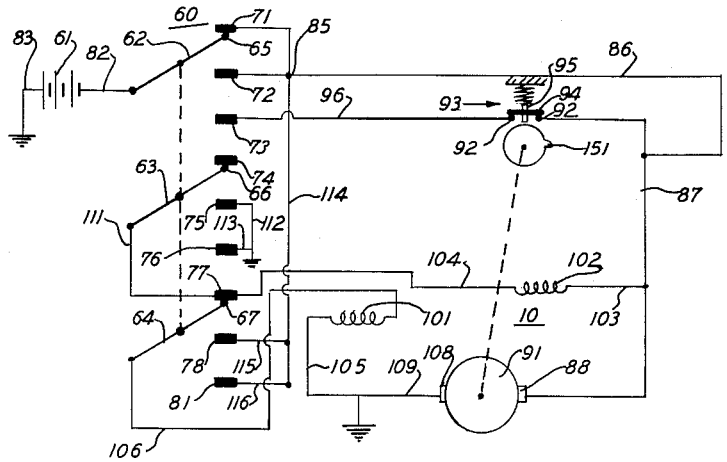
FIG. 6 is an electrical schematic of one embodiment of the invention positioned for high speed operation.

Referring now to FIG. 6, there is shown an electrical schematic of the electrical components of the windshield wiper system including electric motor 10 that is employed to drive the linkage and the windshield wiper mechanism previously described. This electrical circuitry includes a dash mounted actuating switch, generally designated by the numeral 60, that connects a source of electrical energy, preferably a battery 61, to the electric windshield wiper motor 10. The switch 60 is a gang type three pole-three position switch having three arms 62, 63 and 64, that carry contacts 65, 66 and 67, respectively. The contact 65 can come into engagement with any one of three contacts, designated by the numerals 71, 72 and 73, while the contact 66 can come into engagement with any one of three contacts, designated by the numeral 74, 75 and 76. Similarly, contact 67 can come into engagement with any one of contacts 77, 78 and 81. The arm 62 is connected to one terminal of battery 61 through a lead 82, while the other terminal of the battery 61 is grounded through a lead 83.

The contacts 71 and 72 are connected by leads to junction point 85 which in turn is connected to a lead 86. The lead 86 is connected to a lead 87 that in turn is connected to brush 88 positioned in contact with armature 91 of motor 10. The lead 87 is also connected to one contact 92 of a parking switch, generally designated by the numeral 93. The other contact 92 of the parking switch is connected with contact 73 through lead 96. A plate 94 adapted to be moved by arm 95 makes electrical connection between the two contacts 92 when the parking switch is closed as will be explained more fully subsequently.

A pair of shunt field windings, designated by the numerals 101 and 102 respectively, are provided to furnish the field flux for the electric motor. The field winding 102 is connected to lead 87 through a lead 103, and to contact 77 through a lead 104. The other field winding 101 is grounded through a lead 105 and is connected at the other end to arm 64 of swtich 60, through a lead 106. The other brush 108 of the motor 10 is grounded through a lead 109. In addition, the contact 77 is connected to arm 63 through a lead 111, and the two contacts 75 and 76 are grounded through leads 112 and 113. The junction point 85 is connected to contact 78 through leads 114 and 115 and to contact 81 through leads 114 and 116.

With the switch positioned as shown in FIG. 6, the two shunt field windings 101 and 102 are connected in series to provide high speed operation of the armature 91 and of the windshield wiper mechanism. The armature 91 is energized from the battery 61 through lead 82, arm 62, contact 65, contact 71, junction point 85, lead 86, lead 87, and brush 88. The field winding 102 is energized from the lead 87 through lead 103 and in turn is connected to the contact 77 through lead 104. The arm 64 is positioned so that contact 67 engages contact 77 and the field winding 101 is energized in series with the field winding 102 through arm 64 and lead 106. The other end of the field winding 101 is grounded through the lead 105. It is to be understood that during the high speed operation of the electrical motor 10, that the parking switch 93 is opened periodically by cam means driven by the electric motor but that this has no effect on the operation of the windshield wiper mechanism. This structure will be described subsequently.

Figure 7:
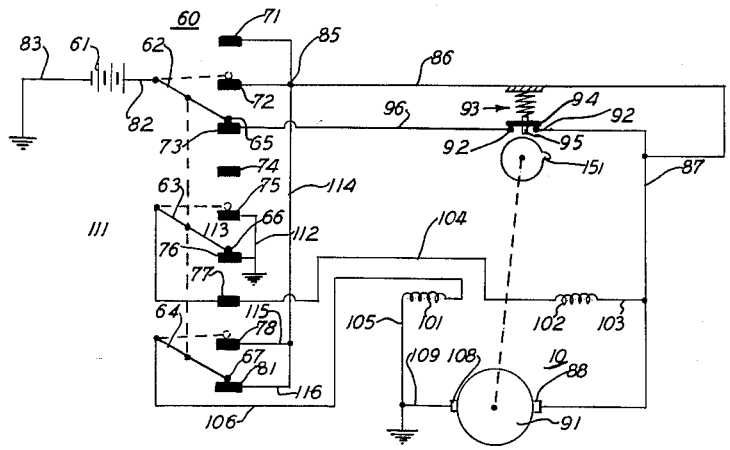
FIG. 7 is another electrical schematic of the embodiment of the invention shown in FIG. 6 but with the switch positioned in the "Park" position.

FIG. 7 is an electrical schematic of the embodiment of the windshield wiper mechanism shown in FIG. 6 with the switch 60 located in the "Park" position. In this case, the armature of the motor is energized from the battery 61, through lead 82, arm 62, contact 65, contact 73, lead 96, contacts 92, plate 94, and lead 87. The field winding 102 is energized from lead 87 and is connected to ground through lead 104, contact 77, lead 111, arm 63, contact 66 and contact 76. The other field winding 101 is energized from the junction 85, that is connected to the energized lead 87 through lead 86, by means of lead 114, lead 116, contact 81, contact 67, arm 64 and lead 106. Thus, when the switch 60 is in the "Park" position the two shunt field coils 101 and 102 are connected in parallel and the motor is energized through the parking switch. It will remain energized until the cam driven by the motor engages the arm or rod 95 to raise plate 94 thereby breaking the connection between the two contacts 92. At this time the motor will stop and the windshield wiper blades will come to a stop. As is conventional, the parking switch is adapted to open at the time that the windshield wiper blades have closely approached the bottom of the windshield.

The windshield wiper mechanism may also be employed to operate continuously at the low speed by moving the switch 60 so that contact 65 is connected to contact 72, contact 66 is connected to contact 75, and contact 67 is connected to contact 78. With this position of the switch, as shown by the dotted lines, the only difference between the energization of the electrical system and the energization of the electrical system when the switch is positioned in the "Park" position is that the junction point 85 is energized from the battery 61 through the contact 72 thereby bypassing the parking switch 93.

As is well understood by those skilled in the art, with the two shunt field windings 101 and 102 connected in series, as shown in FIG. 6, the field flux will be substantially less than that produced when the two field windings 101 and 102 are connected in parallel as shown in FIG. 7. When the field flux is increased it causes the armature of the electric motor to reduce its speed thereby providing two speed operations of the windshield mechanism driven by the motor.

Figure 8:
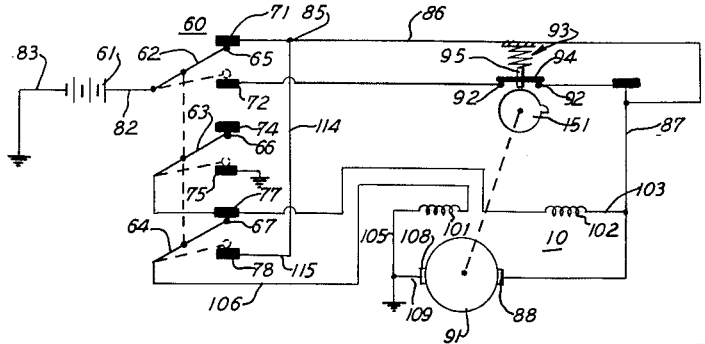
FIG. 8 is an electrical schematic of another embodiment of the invention which is employed to drive a windshield wiper mechanism that operates at a substantially constant speed during normal operating conditions.

This invention may also be employed with a windshield wiper mechanism that is adapted to operate at a constant speed during normal operating conditions. During this constant speed operation, the shunt field coils will be connected in series by means of the electrical circuit shown in FIG. 8. This circuit is similar to those shown in FIGS. 6 and 7 except that the third pair of contacts is missing so that during normal operation the battery 61 energizes the armature through lead 82, arm 62, contact 65, contact 71, lead 86 and lead 87. The field coil 102 is energized from the lead 87 through lead 103 and the other end thereof is connected to the contact 77 through lead 104. The other field winding 101 is energized in series with the coil 102 by connection to contact 77 through contact 67, arm 64 and lead 106. The other end of the field coil 101 is grounded through lead 105. When the switch is moved into the "Park" position, as shown by the dotted lines, the contact 65 is positioned in engagement with contact 72 and hence the armature is energized through the parking switch 93 as described in relation to FIGS. 6 and 7. With this position of the contacts the contact 66 is positioned in engagement with contact 75 thereby grounding one end of the winding 102. The winding 101 is energized in parallel with the winding 102 by means of lead 106, arm 64, contact 67, contact 78, lead 115, lead 114, lead 86, parking switch 93, lead 96, contact 72, contact 65, arm 62 and lead 82. Thus, when the operator throws the switch to the "Park" position the windshield wiper immediately slows down so that it can be parked very readily and very accurately when the parking switch 93 is opened.

Referring now to FIG. 9, there is shown a parking switch that may conveniently be employed with the present invention. This switch is mounted on a cover plate 130 that is adapted to be positioned over the linkage and gear mechanism shown in FIG. 1. The switch includes a main body portion 131 constructed of insulating material that is suitably affixed to the cover plate 130, preferably by means of rivets 133. Mounted within the main body portion 131 is a first terminal 134 and a second terminal 135. These terminals are L shaped and have inwardly extending arms that form contacts 92 shown previously in FIGS. 6 through 8. The rod 95 is mounted within the housing 131 for reciprocating movement therein. This rod contains a collar 142 that is positioned against the plate 94. A spring 143 engages the housing and the plate 94 to urge the plate into contact with the L shaped arms that form contacts 92 and to urge the end portion 146 of the rod 95 inwardly from the plane of the plate member 130 toward the gear mechanism shown in FIG. 1.

The crank arm 22 has an upstanding cam portion 151, as shown in FIG. 1, that is adapted to engage the rod 95 once during every revolution of the nylon gear 13 and hence once during each wiping cycle of the windshield wipers. When the cam 151 comes into engagement with the end 146 of rod 95 it moves it inwardly into the housing 131 and thus moves plate 94 out of engagement with the contacts 92 of L shaped terminals 134 and 135, thereby opening the circuit between contacts 92. It is to be understood that the schematic representation of the circut and the mechanical elements of the mechanism shown in FIGS. 6 through 8 finds its embodiment structurally in the mechanical elements shown in FIGS. 1 through 4 and FIG. 9.

The present invention thus provides a novel two speed electric windshield wiper mechanism in which two speed operation is provided by connecting field coils in series during high speed operation and by connecting these same field coils in parallel during the low speed operation. The invention is also useful with a constant speed windshield wiper in which the circuitry described above reduces the speed of the windshield wiper mechanism just prior to the time that it comes to rest in its parked position.

It will be understood that the invention is not to be limited to the exact construction shown and described, but that various changes and modifications may be made without departing from the spirit and scope of the invention, as defined in the appended claims.

I claim:

1. A two speed windshield wiper system comprising, an electric motor having two field windings, a windshield wiper blade, driving means interconnecting said windshield wiper blade and said electric motor, a source of electrical energy, a three position switch means connected to said source of electrical energy and to said electric motor for energizing said field windings in series with one another when the switch means is located in a first position and for energizing said field windings in parallel with one another when the switch means is located in a second position, a parking switch, means driven by said electric motor for periodically opening said parking switch, said three position switch means energizing said field windings in parallel with one another through said parking switch when the switch means is located in a third position.

2. In a windshield wiper system, a two speed electric motor including a pair of field windings, a windshield wiper blade, driving means interconnecting said windshield wiper blade and said two speed electric motor, a source of electrical energy, two position switch means connected to said field windings and said source of electrical energy for energizing said pair of field windings in series with one another when the switch means is positioned in one position, a parking switch, means driven by said electrical motor for periodically opening said parking switch, said two position switch means energizing said field windings in parallel with one another through said parking switch when the switch means is positioned in the other position.

3. In a windshield wiper system, the combination comprising, a windshield wiper blade, a two speed electric motor, driving means interconnecting said windshield wiper blade and said two speed electric motor, said two speed electric motor comprising a pair of shunt field windings, a source of electrical energy, two position switch means connected to said source of electrical energy for energizing said shunt field windings in series with one another when the switch is in one position, a parking switch, means driven by said electrical motor for periodically opening said parking switch, said two position switch means energizing said electrical motor and said two shunt field windings in parallel with one another through said parking switch when said two position switch is in the other position.

References Cited in the file of this patent
UNITED STATES PATENTS

| | | |
|---|---|---|
| 1,947,265 | Kilburne et al. | Feb. 13, 1934 |
| 2,499,298 | Christensen | Feb. 28, 1950 |